United States Patent [19]

Copp

[11] Patent Number: 4,917,426
[45] Date of Patent: Apr. 17, 1990

[54] BUMPER ATTACHMENT MEANS FOR A NERF STRIP AND LICENSE PLATE HOLDER

[75] Inventor: David F. Copp, Dryden, Mich.
[73] Assignee: Chrysler Corporation, Highland Park, Mich.
[21] Appl. No.: 338,666
[22] Filed: Apr. 17, 1989
[51] Int. Cl.$^4$ .............................................. B60R 19/44
[52] U.S. Cl. .................... 293/142; 293/155; 40/209; 411/182
[58] Field of Search ............... 293/108, 121, 142, 155; 40/201, 209; 411/182, 386, 387

[56] References Cited

U.S. PATENT DOCUMENTS

| | | | |
|---|---|---|---|
| 3,342,000 | 9/1967 | Cripe | 293/155 X |
| 3,374,568 | 3/1968 | Trammell | 40/209 |
| 3,584,407 | 6/1971 | Vrooman | 40/209 |
| 3,669,484 | 6/1972 | Bernitz | 293/142 |

FOREIGN PATENT DOCUMENTS 2084942  4/1982  United Kingdom ................ 293/142

Primary Examiner—Margaret A. Focarino
Assistant Examiner—Gary C. Hoge
Attorney, Agent, or Firm—Edward A. Craig

[57] ABSTRACT

A vehicle bumper nerf strip and license plate holder attachment means for securing the nerf strip and holder to a vehicle bumper is provided. The nerf strip has first and second fasteners for reception in openings provided in the vehicle bumper. Both types of fasteners are insertable by applying external pressure to the nerf strip. The first fasteners are removable upon application of a pulling force. However, the second fasteners, which are utilized to retain a license plate holder in place, are firmly held in place by means of a screw so that they will not come loose upon application of a pulling force.

2 Claims, 1 Drawing Sheet

BUMPER ATTACHMENT MEANS FOR A NERF STRIP AND LICENSE PLATE HOLDER

BACKGROUND OF THE INVENTION

1. Field of the Invention

Vehicle bumper nerf strip and license holder attachment means for securing the nerf strip and holder to a vehicle bumper are provided.

2. Prior Art

Vehicle bumpers are frequently provided with a nerf strip extending from end to end of the bumper. Nerf strips are commonly fabricated of a plastic material which is relatively hard but also flexible. Nerf strips have both an ornamental and utilitarian function. Nerf strips may be provided in different colors and widths to provide a desired design effect. A portion of nerf strips commonly extends outwardly from the bumper surface so that the nerf strip will act as a rub strip to prevent abrasion of the surface of the bumper which may occur as a consequence of normal use of the vehicle, particularly when the vehicle bumper contacts the bumper of another vehicle as in the process of parking.

Various methods have been used to secure nerf strips to bumpers. One method involves use of adhesives. The use of fasteners is also common. Plug-in fasteners provided on the reverse face of the nerf strip are in common use. Such plug-in fasteners are received in openings provided in the bumper to secure the nerf strip in place. This technique is advantageous from the manufacturing standpoint inasmuch as it is only necessary to apply pressure to the exterior face of the nerf strip to force the fasteners into the bumper openings.

In accordance with the present invention, it is desired to mount the license plate holder directly onto the nerf strip. However, license plate holders are subjected to pulling forces during use of the vehicle. One common pulling force is frequently encountered in automatic car washes which employ rotating brushes to clean cars. Such brushes will impact the license plate holder and tend to pull it off. If the holder is not rigidly mounted, it can come loose. With the plug-in type fasteners for the nerf strip as above-described, the license plate holder could pull the entire nerf strip off of the vehicle. This results from the fact that while the plug-in devices are easy to mount by applying a force to the exterior face of the nerf strip, they may also be removed by applying a pulling force to the nerf strip.

The present invention resolves this problem by positively fastening the nerf strip to the vehicle at the point of attachment of the license plate holder so that the nerf strip will not come loose at this point even if a pulling force is exerted against the holder. The remainder of the nerf strip is not normally subjected to pulling forces therefore positive engagement of the fasteners is not necessary.

SUMMARY OF THE INVENTION

Vehicle bumper nerf strip and license plate holder attachment means is provided for securing the nerf strip and holder to a vehicle bumper. The vehicle bumper has a plurality of spaced apart openings therein for receiving nerf strip fasteners. The nerf strip is formed as an elongated strip of plastic material securable to the exterior face of the bumper across the length thereof. The nerf strip has an inner face and an outer face. A plurality of spaced apart first fasteners are provided on the inner face of the nerf strip. The first fasteners are receivable in said spaced apart openings in the vehicle bumper by the application of a pushing force on the outer face of the nerf strip and removable by the application of a pulling force on the nerf strip.

At least one second fastener is provided on the inner face of the nerf strip. The second fastener comprises a pair of spaced apart flexible legs extending outwardly from said inner face. Each leg has an enlarged portion on the outer end thereof. The second fastener is receivable in one of said openings in the vehicle bumper by the application of a pushing force on the outer face of the nerf strip. A self-threading screw is provided. The screw is threadable through the nerf strip after the second fastener has been received in said opening in the vehicle bumper. The screw is of sufficient length so that a portion thereof will extend between the legs of the second fastener upon complete threading of the screw into the nerf strip to thereby prevent flexing of the legs towards each other upon application of a pulling force on the nerf strip. The enlarged portions on the outer ends of the legs are engagable with the inner face of the vehicle bumper to thereby positively retain the second fastener in place.

A license plate holder is provided. The license plate holder has at least one opening therein. The screw is insertable through the opening in the holder prior to threading through the nerf strip to thereby secure both the nerf strip and holder in place.

A dimple is preferably provided in the outer face of the nerf strip aligned with the second fastener at the center of the space between said legs to function as a location point for the tip of the screw prior to the threading of the screw into the nerf strip. A boss is provided on the inner face of the nerf strip in the space between said legs. The boss has a cylindrical opening therein to function as a guide for the screw. Each leg has a trough therein extending from the cylindrical opening to the outer end of the leg to function as guide means for the screw. The screw is of sufficient length to extend between the legs of the second fastener substantially to the outer ends thereof upon complete threading of the screw into the nerf strip. A pair of spaced apart webs extend between said legs. The troughs are positioned between the webs. The webs function to maintain the legs in spaced apart relationship with respect to each other.

IN THE DRAWING

DETAILED DESCRIPTION OF A PREFERRED EMBODIMENT

Figure 1:
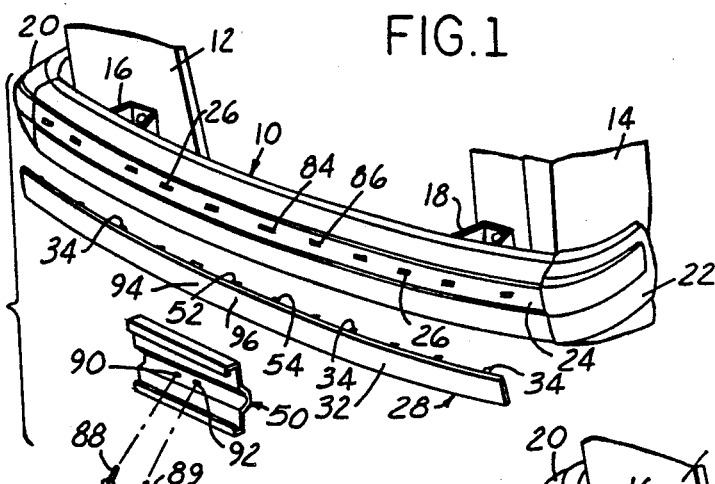
FIG. 1 is an exploded view in perspective illustrating a vehicle bumper secured to a vehicle with the nerf strip, license plate holder and screws in position for mounting on the bumper.
Figure 2:
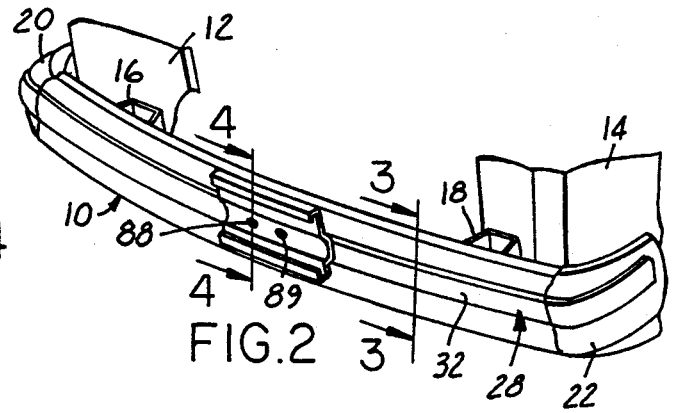
FIG. 2 is a view in perspective illustrating the elements of FIG. 1 after mounting of the nerf strip and license plate holder onto the vehicle bumper.

As will noted in FIGS. 1 and 2, a vehicle bumper 10 is mounted on vehicle support structure 12, 14 by means of brackets 16, 18. The bumper 10 is fabricated of a metal such as steel and may have a chrome plated exterior face. The bumper 10 has wrap around end pieces 20, 22. An elongated indentation 24 extends across the length of the bumper 10 centrally thereof. A plurality of spaced apart openings 26 are provided therealong for receiving first nerf strip fasteners as will be later described.

A nerf strip 28 is receivable along the length of the indentation 24 to thereby extend across the length of the bumper 10. The nerf strip 28 is formed as an elongated strip of plastic material. The plastic may be, for example, a urethane. The nerf strip 28 has an inner face 30 and an outer face 32. A plurality of spaced apart first fasteners 34 are provided on the inner face 30. The nerf strip and fasteners may be formed as, for example, by a molding process.

Figure 3:
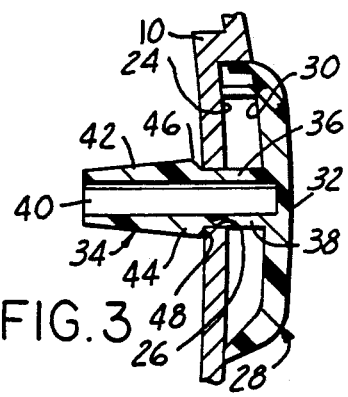
FIG. 3 is a sectional view taken substantially along the line 3—3 of FIG. 2 looking in the direction of the arrows.

Referring to FIG. 3, it will be noted that the first fasteners 34 comprise a pair of spaced apart flexible legs 36, 38 separated by a web 40. The legs extend outwardly from the inner face 30 of the nerf strip. Each leg has an enlarged portion 42, 44. Portions 42, 44 are tapered and define shoulders 46, 48. The first fasteners 34 are receivable in mating openings 26 in the vehicle bumper 10 by the application of a pushing force on the outer face 32 of the nerf strip 28. The legs 36, 38 flex towards each other, with the web collapsing, upon insertion through the openings. Once the legs have passed through the openings, the web 40 causes them to again spread apart whereupon the shoulders 46, 48 retain the fasteners in place. However, the fasteners may be removed by the application of a pulling force on the nerf strip 28. In normal usage, such a pulling force is not applied and the nerf strip 28 stays in place.

In the present case, it is desired to mount a license plate holder 50 directly upon the nerf strip 28. It may happen that a pulling force is applied against the license plate holder 50 during normal usage, such as when the vehicle travels through an automatic car wash. Automatic car washers employ large rotating brushes in the vehicle cleaning process. Such brushes can, and sometimes do, exert a force against the license plate holder 50 tending to pull the nerf strip 28 out of engagement with the vehicle bumper 10. It is therefore necessary to more positively secure the nerf strip 28 to the vehicle bumper 10 at the location of the license plate holder 50.

Figure 6:
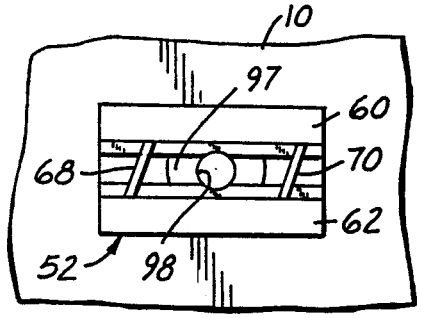
FIG. 6 is a view looking in the direction of arrows 6—6 of FIG. 4.
Figure 7:
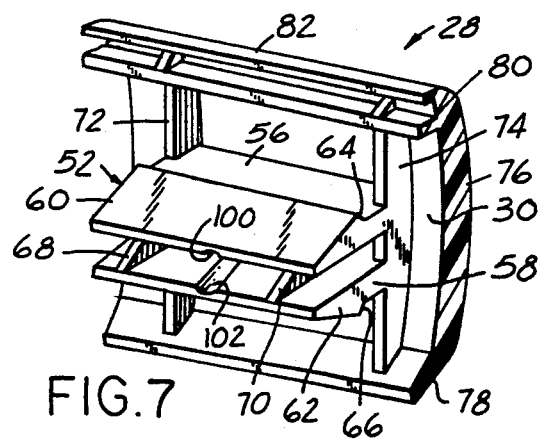
FIG. 7 is a perspective view of the nerf fastener illustrated in FIG. 6.

This is accomplished by providing second fasteners 52, 54, illustratively, centrally of the nerf strip 28. The second fasteners are similar in construction to the first fasteners. As will be noted in FIGS. 6 and 7, the fastener 52 includes a pair of spaced apart flexible legs 56, 58 extending outwardly from the inner face 30 of the nerf strip 28. Each leg has an enlarged portion 60, 62 on the outer end thereof. As previously described, the portions 60, 62 are tapered and define shoulders 64, 66. The legs 56, 58 are wider than the legs 36, 38 of the first fasteners 34. Therefore, a pair of spaced apart webs 68, 70 are provided extending between the legs. The webs are slanted at an angle other than 90° with respect to the legs 56, 58 to permit ready collapsing thereof upon insertion of the fastener through its opening. Rigidifying reinforcing walls 72, 74 are provided at the outer ends of the second fastener 52. The nerf strip 28 comprises a main outer wall 76 from which extends elongated bumper contact lips 78, 80 and an elongated sealing lip 82.

Figure 4:
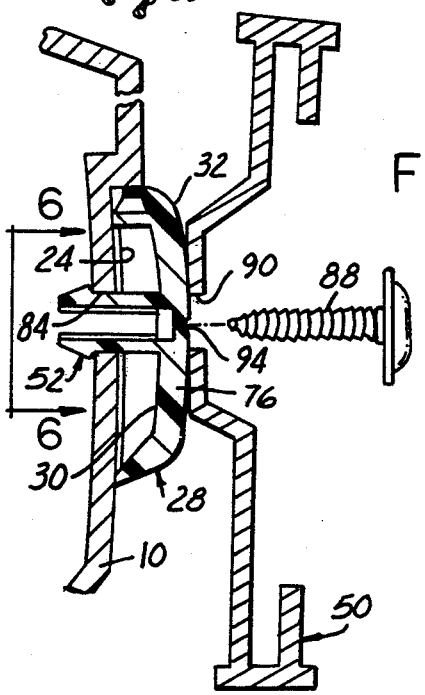
FIG. 4 is a sectional view taken substantially along the line 4—4 of FIG. 2 looking in the direction of the arrows with the screw in position for threading into the nerf strip.

The second fasteners 52, 54 are received in mating openings 84, 86 provided in the bumper 10. These openings are slightly wider because of the size of the second fasteners. Referring to FIG. 4, it will be noted that the second fasteners are receivable in their mating openings in the manner described in connection with FIG. 3.

After the second fasteners are mounted, the license plate holder 50 is mounted in place at the location of the second fasteners. This is accomplished by means of self-threading screws 88, 89. The license plate holder 50 has openings 90, 92 for passage of the screws 88, 89. A pair of dimples 94, 96 are provided in the outer face 32 of the nerf strip 28 aligned with the second fasteners 52, 54 at the center of the space between the fastener legs to function as location points for the tips of the screws prior to threading of the screws into the nerf strip. This ensures that the screws will be properly positioned with respect to the fasteners 52, 54.

Figure 5:
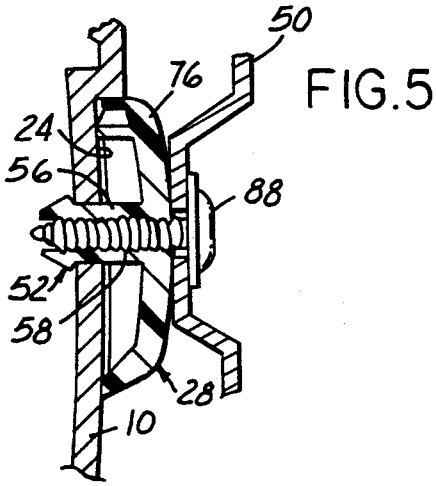
FIG. 5 is a view similar to FIG. 4 illustrating the screw threaded into the nerf strip.

A boss 97 in the shape of a segment of a cylinder is provided on the inner face 30 of the nerf strip in the space between the legs 56, 58. The boss 97 has a cylindrical opening 98 to function as a guide for the screw 88 and to some extent to function as a retainer for the screw. Each leg 56, 58 has a trough 100, 102 therein extending from the cylindrical opening 98 to the outer end of the leg to function as guide means for the screw. The screw 88 is threaded through the wall 76 of the nerf strip and thence through the opening 98 and, finally, through the troughs 100, 102 to result in the assembled structure illustrated in FIG. 5. The screw is of sufficient length to extend between the legs 56, 58 substantially to the outer ends thereof upon complete threading of the screw into the nerf strip 28. This prevents flexing of the legs 56, 58 towards each other upon application of a pulling force on the nerf strip caused by an external force tugging on the license plate holder 50. This arrangement results in positively retaining the second fasteners in place to thereby firmly secure both the nerf strip 28 and license plate holder 50 in place.

I claim:

1. Vehicle bumper nerf strip and license plate holder attachment means for securing the nerf strip and holder to a vehicle bumper having an exterior face and an inner face, the bumper including a plurality of spaced apart openings therein for receiving nerf strip fasteners, comprising a nerf strip formed as an elongated strip of plastic material securable to the exterior face of the bumper across the length thereof, the nerf strip having an inner face and an outer face, a plurality of spaced apart first fasteners on the inner face of the nerf strip, the first fasteners being receivable in said spaced apart openings in the vehicle bumper by the application of a pushing force on the outer face of the nerf strip and removable by the application of a pulling force on the nerf strip, at least one second fastener on the inner face of the nerf strip, the second fastener comprising a pair of spaced apart flexible legs extending outwardly from said inner face and terminating in outer ends, each leg having an enlarged portion on the outer end thereof, the second fastener being receivable in one of said openings in the vehicle bumper by the application of a pushing force on the outer face of the nerf strip, a self threading screw threadable through the nerf strip after the second fastener has been received in said opening in the vehicle bumper, a dimple provided in the outer face of the nerf strip aligned with the second fastener at the center of the space between said legs to function as a location point for the tip of the screw prior to threading of the screw into the nerf strip, a boss on the inner face of the nerf strip in the space between said legs, the boss having a cylindrical opening therein to function as a guide for the screw, each leg having a trough therein extending from said cylindrical opening to the outer end of the leg to function as guide means for the screw, the screw being of sufficient length so that a portion thereof will extend between the legs of the second fastener upon complete threading of the screw into the nerf strip to thereby prevent flexing of the legs towards each other upon application of a pulling force on the nerf strip, said enlarged portions on the outer ends of the legs engagable with the inner face of the vehicle bumper to thereby positively retain the second fastener in place, and a license plate holder, the license plate holder having at least one opening therein, the screw being insertable through the opening in the holder prior to threading through the nerf strip to thereby secure both the nerf strip and holder in place.

2. Attachment means as defined in claim 1, further characterized in the provision of a pair of spaced apart webs extending between said legs, the webs being slanted at an angle other than 90° with respect to the legs, said troughs being positioned between the webs, the webs functioning to maintain said legs in spaced apart relationship with each other.

* * * * *